United States Patent
Shal et al.

(10) Patent No.: US 6,633,803 B1
(45) Date of Patent: Oct. 14, 2003

(54) METHOD AND APPARATUS FOR DETERMINING SLEW RATE LIMITS AND CONTROLLING DAMPERS IN A SUSPENSION SYSTEM

(75) Inventors: David Andrew Shal, Bellbrook, OH (US); Chinh Trong Nguyen, Dayton, OH (US); Timothy John Juuhl, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/660,898

(22) Filed: Sep. 13, 2000

(51) Int. Cl.[7] ............................................. B60G 17/08
(52) U.S. Cl. ........................................................ 701/37
(58) Field of Search .............................. 701/36–38, 48, 701/91; 180/232, 41; 280/5.5, 5.501, 5.504–5.509, 5.512–5.515, 6.157

(56) References Cited

U.S. PATENT DOCUMENTS

| | | |
|---|---|---|
| 5,062,657 A | 11/1991 | Majeed |
| 5,062,658 A | 11/1991 | Majeed |
| 5,071,157 A | 12/1991 | Majeed |
| 5,096,219 A | 3/1992 | Hanson et al. |
| 5,235,529 A | 8/1993 | Hanson et al. |
| 5,255,191 A | 10/1993 | Fulks |
| 5,282,645 A | 2/1994 | Spakowski et al. |
| 5,446,662 A * | 8/1995 | Kojima et al. ............. 701/38 |
| 5,559,700 A * | 9/1996 | Majeed et al. ............. 701/36 |
| 5,570,288 A * | 10/1996 | Badenoch et al. ......... 701/37 |
| 5,606,503 A | 2/1997 | Shal et al. |
| 6,097,999 A | 8/2000 | Shal et al. |

* cited by examiner

Primary Examiner—Thu Nguyen
(74) Attorney, Agent, or Firm—Robert M. Sigler (57) ABSTRACT

The invention provides a method and apparatus for controlling dampers in a suspension system of a vehicle body. A heave velocity of a vehicle body is derived from sensed dynamic variables of the vehicle body. A slew rate limit for a damping control command is derived in response to the heave velocity of the vehicle body. The damping control command for at least one dampers is generated in accordance with the slew rate limit. The limited damping control command is applied to the at least one damper

8 Claims, 5 Drawing Sheets

METHOD AND APPARATUS FOR DETERMINING SLEW RATE LIMITS AND CONTROLLING DAMPERS IN A SUSPENSION SYSTEM

TECHNICAL FIELD OF THE INVENTION

The present invention relates to vehicle coefficients of force being offset through suspension damping, and, in particular, to a method and system for providing slew rate limiting parameters for use with suspension damping control outputs.

BACKGROUND OF THE INVENTION

Known variable force suspension systems include variable force shock absorbers and/or struts that provide suspension damping forces at a magnitude controllable in response to commands provided by a suspension system controller. Some systems provide control between two damping states and others provide continuously variable control of damping force.

In a known manner of control of a variable force suspension, the demand force for each variable force damper is determined responsive to a set of gains, the wheel vertical velocity and the body heave, roll and pitch velocities. An example system determines the demand force as follows: $DF_b = G_h H' + G_r R' + G_p P' + G_w v$, where $DF_b$ is the demand force, $G_h$ is the heave gain, $G_r$ is the roll gain, $G_p$ is the pitch gain, $G_w$ is the wheel velocity gain, H' is the body heave velocity, R' is the body roll velocity, P' is the body pitch velocity and v is the wheel vertical velocity. The portion of the demand force computation $G_h H' + G_r R' + G_p P'$, represents the body component determined responsive to the body heave, roll, and pitch velocities. The portion of the demand force computation $G_w v$ represents the wheel component determined responsive to the difference between the computed body corner velocity and the body-wheel relative velocity.

A control signal representing the determined demand force is output to control the variable force damper responsive to the demand force. Example systems are described in U.S. Pat. Nos. 5,606,503; 5,235,529; 5,096,219; 5,071,157; 5,062,657; and 5,062,658. Current damping algorithms tend to change the damper output signals abruptly during zero crossings of the associated damper relative velocity signal. Over large inputs, which cause significant body motions, it is sometimes more desirable to retain an elevated damping state. Damper output stewing is a means known in the art for performing this function, however its slew rate parameters cause excess damping control to be present during normal driving. The excess damping causes unwanted forces to be dissipated throughout the vehicle.

Therefore, it would be desirable to have an algorithm that would mode or switch the slew rate limiting parameters in order to allow longer slew times during large inputs and smaller slew times during smaller inputs. Such an algorithm would provide for smoother, more complete control over large inputs caused by rough terrain, while not adversely affecting ride comfort over other road surfaces.

SUMMARY OF THE INVENTION

One aspect of the invention provides a method for controlling dampers in a suspension system of a vehicle body. A heave velocity of a vehicle body is derived from sensed dynamic variables of the vehicle body. A slew rate limit for a damping control command is derived in response to the heave velocity of the vehicle body. The damping control command for at least one dampers is generated in accordance with the slew rate limit. The limited damping control command is applied to the at least one damper.

Another aspect of the invention provides a method of determining a slew rate limit for a suspension damping control system. An average heave velocity is determined. The slew rate limit is then determined as a function of the average heave velocity.

Another aspect of the invention provides a control module for a suspension damping control system comprising a means for deriving a heave velocity of a vehicle body from sensed dynamic variables of the vehicle body, a means for deriving a slew rate limit for a damping control command in response to the heave velocity of the vehicle body, a means for generating the damping control command for at least one dampers in accordance with the slew rate limit, and a means for applying the limited damping control command to the at least one damper.

Another aspect of the invention provides a control module for a suspension damping control system comprising means for determining an average heave velocity; and means for determining a slew rate limit as a function of the average heave velocity. Another aspect of the invention provides a computer readable medium storing a computer program comprising computer readable code for deriving a heave velocity of a vehicle body from sensed dynamic variables of the vehicle body, computer readable code for deriving a slew rate limit for a damping control command in response to the heave velocity of the vehicle body, and computer readable code for generating the damping control command for at least one dampers in accordance with the slew rate limit.

Another aspect of the invention provides a computer readable medium storing a computer program comprising computer readable code for determining an average heave velocity, and computer readable code for determining a slew rate limit as a function of the average heave velocity.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE INVENTION

Figure 1:
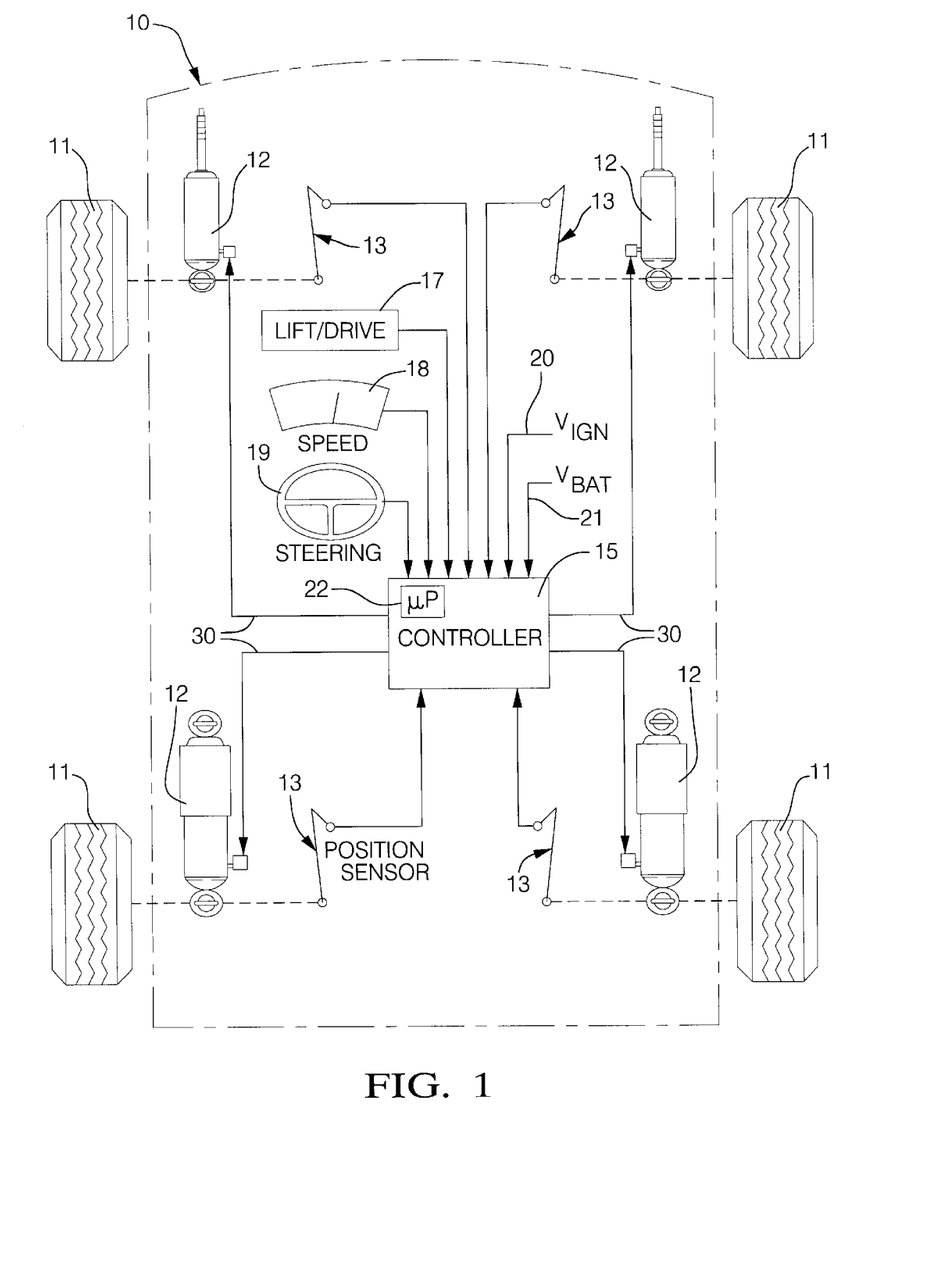
FIG. 1 is a schematic view of one embodiment of an apparatus in accordance with the invention.

Referring to FIG. 1, an example apparatus for implementation of this invention is shown and, in general, comprises a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Although many such suspension arrangements are known and appropriate to this invention, actuator 12 of this embodiment comprises an electrically controllable, variable force damper in parallel with a weight bearing coil spring in a parallel shock absorber/spring or for example, a McPherson strut arrangement. U.S. Pat. No. 5,282,645 describes a variable force damper suitable for use as actuator 12.

Each corner of the vehicle can include a linear position sensor 13 that provides an output signal indicative of the relative distance between the vehicle wheel and the suspended vehicle body at that corner of the vehicle. Suitable position sensors 13 can be easily constructed by those skilled in the art. The outputs of the position sensors 13 may be differentiated to produce relative body-wheel vertical velocity signals for each corner of the vehicle. The vertical velocity signals may be used to determine the body modal velocities of body heave velocity, body roll velocity and body pitch velocity. One embodiment defines the heave velocity as the vertical velocity of the center of gravity of a vehicle.

One embodiment of a position sensor 13 includes a rotary resistive device mounted to the vehicle body and a link pivotally coupled between both the vehicle wheel and a pivot arm on the rotary resistive device. This allows the rotary resistive device to provide an impedance output that varies with the relative position between the wheel 11 and the corner of the body 10. Each position sensor 13 may further include an internal circuit board with a buffer circuit for buffering the output signal of the rotary resistive device and providing the buffered signal to the controller 15. Suitable position sensors 13 can be easily constructed by those skilled in the art. Any alternative type of position sensor, including transformer type sensors, may be used as position sensor 13.

The outputs of relative position sensors 13 can be provided to a controller 15 which processes the signals to determine the states of vehicle body 10 and wheels 11 and generates an output actuator control signal for each variable actuator 12. These signals are applied from controller 15 through suitable output apparatus to control actuators 12 in real-time. Input signals for the determination of the output actuator control signals may also be provided to a microcomputer to provide anticipation of vehicle pitch (lift/dive) 17. Alternatively, the input signals may be used by a vehicle speed sensor 18 and a steering wheel angular position sensor 19 to provide anticipation of vehicle roll. Obtaining such signals is easily achieved using known types of sensors available to those skilled in the art. Processing of the sensor input can be conducted by a digital microcomputer 22, a component of the controller 15.

Figure 2:
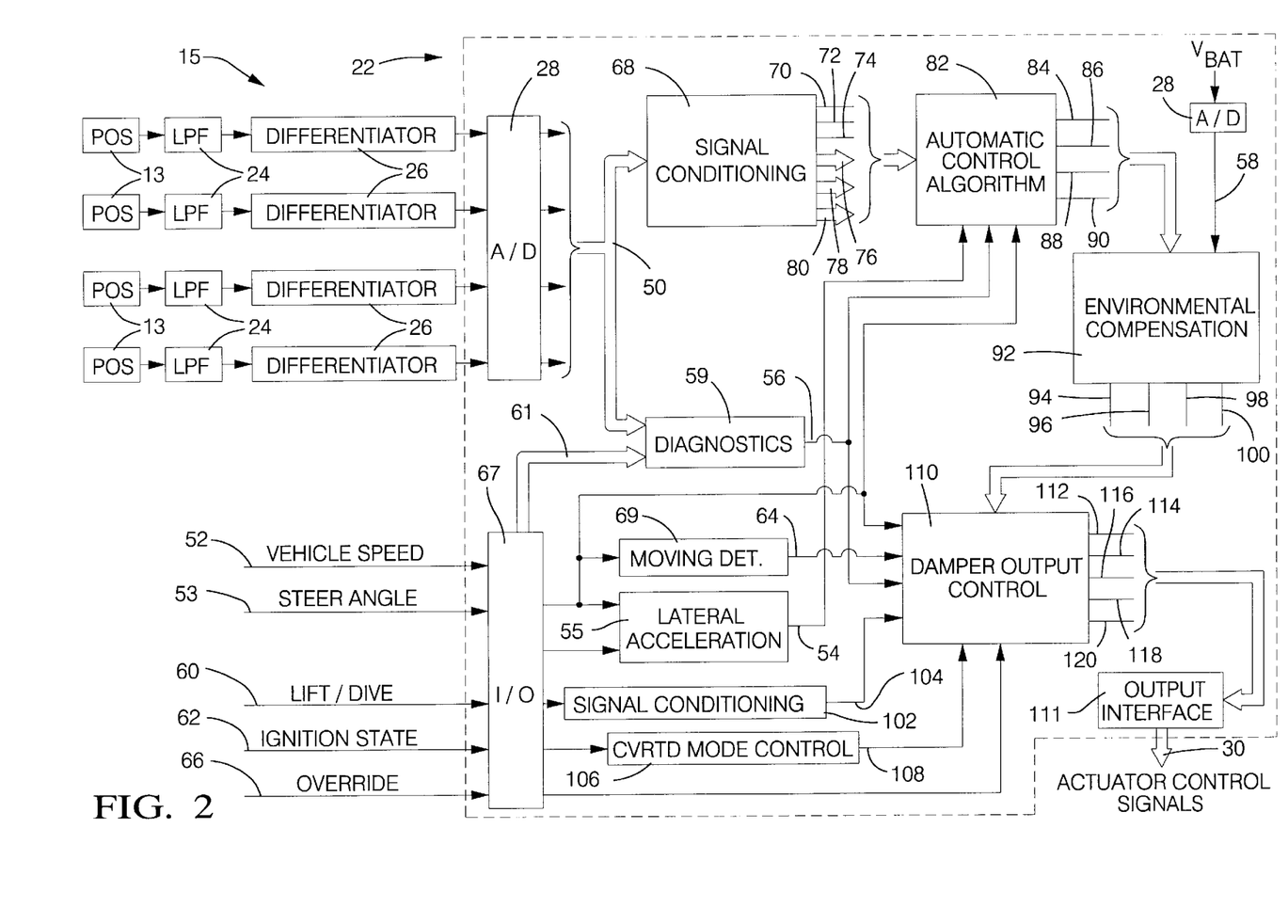
FIG. 2 is a block diagram of a control module for one embodiment implementing the invention.

One embodiment of control module 15 is shown in more detail in FIG. 2. Signals from relative position sensors 13 can be low-pass filtered through, as shown, four analog low-pass filters 24 and differentiated through four analog differentiators 26, to provide four relative velocity signals. One embodiment of such a low-pass filter and differentiator is shown in U.S. Pat. No. 5,255,191. The resulting signals represent the relative velocity between the front left wheel and the front left corner of the body $rv_1$, the rear left wheel and the rear left corner of the body $rv_2$, the front right wheel and the front right corner of the body $rv_3$, and the rear right wheel and the rear right corner of the body $rv_4$. Each of these relative velocity signals is input to the digital microcomputer 22, which includes input A/D converter 28 with multiplexed inputs. Each input is digitally high-pass filtered within microcomputer 22 to remove any DC offset introduced by the digitization of A/D converter 28.

In the described embodiment, the actuators are controlled by a PWM (Pulse Width Modulation) signal. However, actuators of another type not based on PWM signals can be substituted in alternative embodiments. It will be recognized that variable force controls other than those with PWM are equivalent to the PWM controlled signal example set forth herein.

The actuator control is performed by a microprocessor suitable for providing PWM output. Such microprocessors are known and readily available to those skilled in the art. The output of the PWM duty cycle within control module 15 is represented as lines 112, 114, 116 and 118. This output may be in the form of signals representing duty cycles that standard microprocessors readily convert to the proper duty cycle PWM output, for example as with a standard PWM output interface 111.

Reference 50 represents four input signals of the relative velocities of the four corner suspensions of the vehicle. The relative velocities are determined from the position sensors 13, by the low pass filtering of the outputs of sensors 13, through four analog low pass filters 24. The filtered outputs continue through four analog differentiators 26 to produce four relative velocity signals. These signals represent the relative velocities $rv_1$, $rv_2$, $rv_3$, and $rv_4$. Each of these relative velocity signals is input into the microprocessor 22 through an A/D converter 28.

In an alternative embodiment, relative position sensors 13 are replaced with relative velocity sensors of a type known to those skilled in the art. These sensors are capable of outputting a signal indicative of the relative velocity between each wheel and corner of the vehicle body. With these sensors, there is no need for the differentiators 26 described above used to convert the signals from sensors 13 to relative velocity signals.

Various discrete signals are provided to the microprocessor input/output port 67. The vehicle speed input 52 is preferably buffered in a known manner to remove unwanted noise. Input of lateral acceleration 54 of the vehicle is computed 55 in a manner based on the steer angle of the front wheels 53 and the vehicle speed 52. A standard diagnostic routine 59 performs known diagnostic functions such as checking for open circuits and short circuits from any of the input lines represented by bus 50 and 61. In response to a diagnostic 59 failure command 56, the damper output control 110 forces a default output on lines 112, 114, 116 and 118 to control the actuators in a default mode.

A digital signal representing the battery voltage is input 58 through the microprocessors A/D converter 28 and is used at environmental compensation 92 to scale the duty cycle commands responsive to the battery voltage. The lift/dive signal 60 indicates the vehicle is in a dive (front-end dip) or lift (front-end rise) tendency situation such as occurs during hard braking or hard acceleration of the vehicle. The dive signal may be provided by a power train controller that determines a vehicle dive situation if a decrease in vehicle speed over a predetermined period is greater than a predetermined limit. The lift signal may be determined if an increase in throttle angle over a predetermined period is greater than a predetermined threshold. In general, the lift/dive signal 60 is active when there is either a detected lift or dive, and is otherwise inactive. Signal Conditioning 102 receives the lift/dive signal 60 and performs a de-bounce function of a known type. The de-bounced lift/dive signal 104 is provided to the damper output control 110. The damper output control 110 further buffers the lift/dive signal. It also determines whether a base profile output override is active and if so, determines what PWM duty cycle to use as the base (minimum duty cycle). Additionally the damper output control 110 applies the time-varying lift/dive PWM duty cycle base as the minimum PWM duty cycle.

The damper output control 110 limits to 10 seconds (as an example of this embodiment) the amount of time that the control module 15 will follow a lift/dive signal. Thus, if a short circuit causes an erroneous lift/dive signal, the system is only affected for 10 seconds.

The ignition state signal 62 is representative of the ignition voltage available when the vehicle is keyed on, and is de-bounced in a known manner. The moving determination Block 69 provides a signal 64 indicating whether or not the vehicle is moving. An override line 66 is available to be used for in-plant testing of the system.

The corner relative velocity signals 50 that are input to the signal conditioning Block 68 are computed to provide velocity information to the automatic control algorithm 82. The information includes the relative velocity signals provided on buses 76, 78, and 80 along with heave velocity signal provided on bus 70, roll velocity signals on bus 72, and pitch velocity signals on bus 74. These signals are used as a set of inputs to a control algorithm 82 to help determine the output actuator control signals for the vehicle suspension system.

Figure 3:
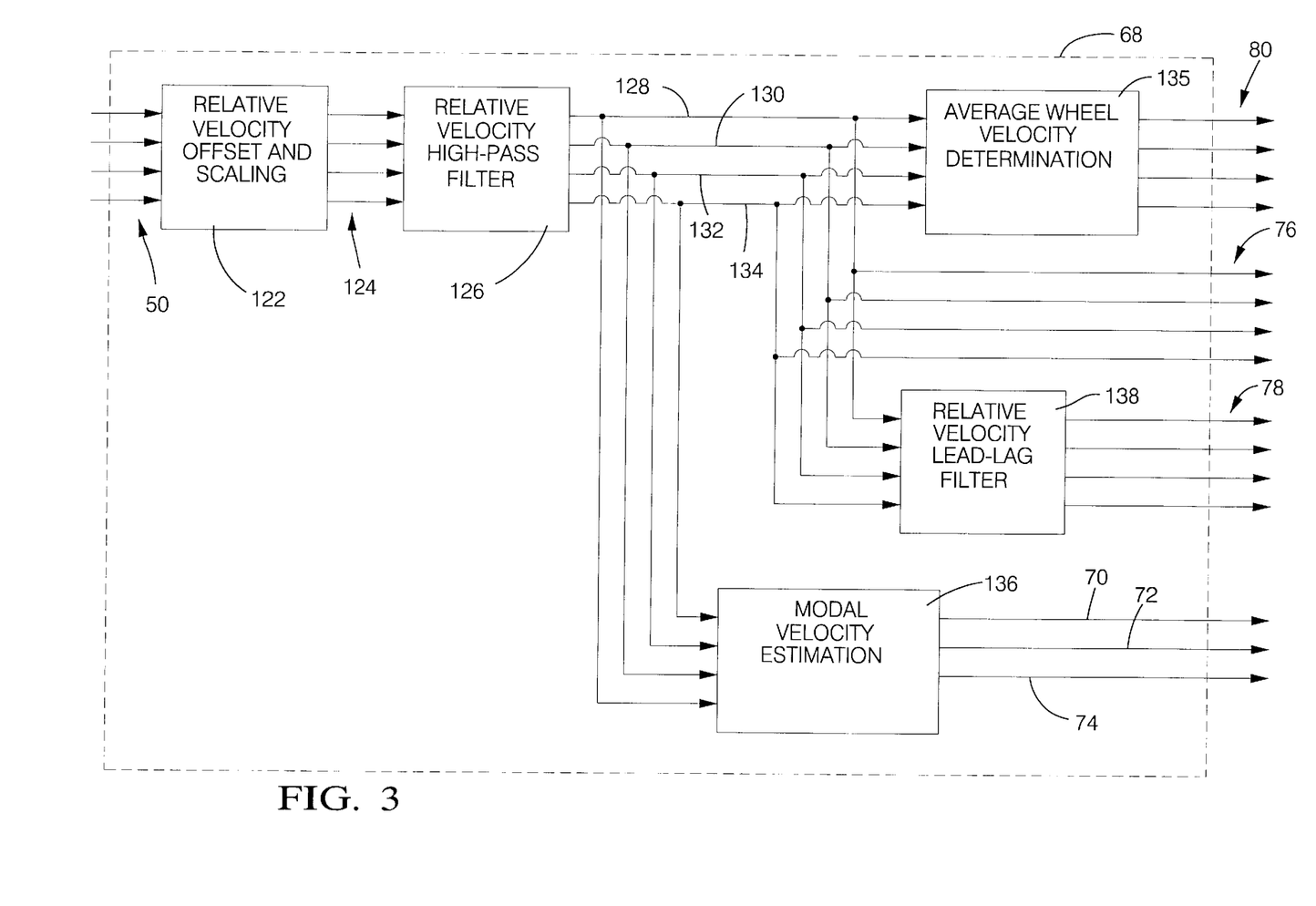
FIG. 3 is a block diagram of signal computational components of a control module for use with a control module of one embodiment of the invention.

Descriptions of signal conditioning Block 68 computational components are illustrated in FIG. 3. The relative velocity input signals 50 from the microprocessor's A/D converters are offset 122 so that the scaled value represents wheel motion. The scaling is achieved by simply multiplying the offset results by a predetermined scaling factor. The results are the offset, scaled relative velocity signals 124. The signals 124 are provided to a relative velocity high-pass filter 126, which performs a digital high pass filtering to further remove any DC offsets introduced by the digitization of the A/D converter. The filtered relative velocity signals for the four corner suspension are provided on lines 128, 130, 132 and 134 to the average wheel velocity determination 135, the modal velocity estimation 136, and the relative velocity lead-lag filter 138.

The average vertical wheel velocity is determined 135 by first high pass or band pass filtering each of the signals on lines 128–134 separately to isolate the wheel content of each relative velocity signal from the body content. That is, the high pass or band pass filter eliminates the 1 Hz. component while passing the 10 Hz. component of the signal. The absolute value of the output of the high pass filter is taken in order to obtain the magnitude information of the output signal. The magnitude information is averaged and a low pass filter is applied to each of the rectified signals 80. The signals 80 are then indicative of the average wheel velocity of one of the four wheels.

An example high pass filter for isolating the wheel component of each signal 128–134 can be implemented using the equation $V_{av}(k)=rv_x(k)-rv_x(k-1)+a*V_{av}(k-1)$, where $V_{av}$ is the average vertical wheel velocity, k represents the current sampling period, $rv_x$ is the suspension relative velocity for corner x of the vehicle, and a is a predetermined constant. An example low pass filter may be implemented according to the equation $V_{av}(k)=b \cdot rv_x(k)+(1-b)V_{av}(k-1)$, where b is a constant.

The modal velocity estimation 136 receives the relative velocity signals 128–134 and determines the body heave roll and pitch velocities. This is done by performing a set of geometric transforms to obtain the relative states of relative heave velocity, relative roll velocity and relative pitch velocity between the vehicle body and wheels. The geometric transforms used to obtain the relative heave velocity ($rv_H$), relative roll velocity ($rv_R$), and relative pitch velocity ($rv_P$) are implemented respectively as follows: $rv_H=(rv_1+rv_2+rv_3+rv_4)/4$, $rv_R=(-rv_1+rv_3)/tw$, $rv_P=(-rv_1+rv_2-rv_3+rv_4)/(2*wb)$, where tw is the average track width or wheel span, and wb is the wheel base. In the determination of $rv_R$, only $rv_1$ and $rv_3$ are used in vehicles in which flexing or noise of the rear suspension affects the quality of the relative roll velocity determined using $rv_2$ and $rv_4$. If rear suspension flexing or noise does not affect the relative roll velocity determination, then the determination of $rv_R$ can be set according to the equation $rv_R=(rv_1-rv_2+rv_3+rv_4)/(2*tw)$.

Once each of the transforms is completed, a digital low pass filter filters each of the relative heave, roll and pitch velocities to derive accurate estimates of the body heave, roll and pitch velocity. The low-pass filter provides a significant amplitude roll-off above the 1 Hz signal typical of resonant body modal vibrations. This is to suppress the 10 Hz signals typical of resonant vertical wheel vibrations and thus yield a signal with information about the amplitude of vehicle body motion in the heave, roll and pitch modes. However, for such signals to be usefully applied in a real time control system, their phase is critical. Low pass filters tend to produce a phase lag in the signal and this phase lag increases across the frequency spectrum through a range that increases with the number of filter poles. In order to produce effective control in real time, of rapidly moving suspension components, the control signal must be applied in correct phase relationship thereto. To emulate the integrated output of an absolute accelerometer, a phase lead of approximately 90 degrees is required. To achieve this, a two pole low pass filter is applied to the relative body modal velocity signal, producing a signal with a 90 degree phase lag, which is inverted to provide the required 90 degree phase lead. A suitable second order low pass filter for use in the estimation is equated as $H_Q(s)=K_Q[\omega_o^2/(s^2+(\omega_o/Q)s+\omega_o^2)]$, where $K_Q$ is the filter gain, $\omega_o$ describes the filter pole locations in radians and Q is the filter quality factor.

Each low pass filter may be adjusted independently to tune the modal velocity estimates to match in magnitude. With an additional phase inversion, signals achieved by the use of an accelerometer or any similar device may be obtained. The values of the filter gains, pole locations and quality factor tend to change from vehicle type to vehicle type due to differences in the natural body and wheel frequencies of different vehicle models. The heave, roll and pitch velocities obtained are estimations since they are derived from relative measurements and not from absolute measurements. The results of the modal velocity estimation 136 are heave velocity 70, roll velocity 72, and pitch velocity 74.

The lead-lag filter 138 receives the relative velocity signals 128–134, filters the signals and adds an approximate lead to the signal. This compensates for phase lag that may be introduced within the system, including that of the differentiator circuit, at the expense of a certain degree of magnitude distortion.

A single pole infinite impulse response high-pass filter is used to provide a desired amount of phase lead at wheel hop frequencies. Specifically, the filter may be implemented using the transfer function $H(z)=(LLA-LLBz^{-1})/(1-LLCz^-$ 1), where H(z) is a discrete, or "z" domain transfer function relating the z-transform of the filter output to that of the filter input. LLA, LLB and LLC are calibration constants stored in memory. The outputs of the relative velocity lead-lag filter 138 are the filtered relative velocity signals 78 for each corner of the vehicle.

Figure 4:
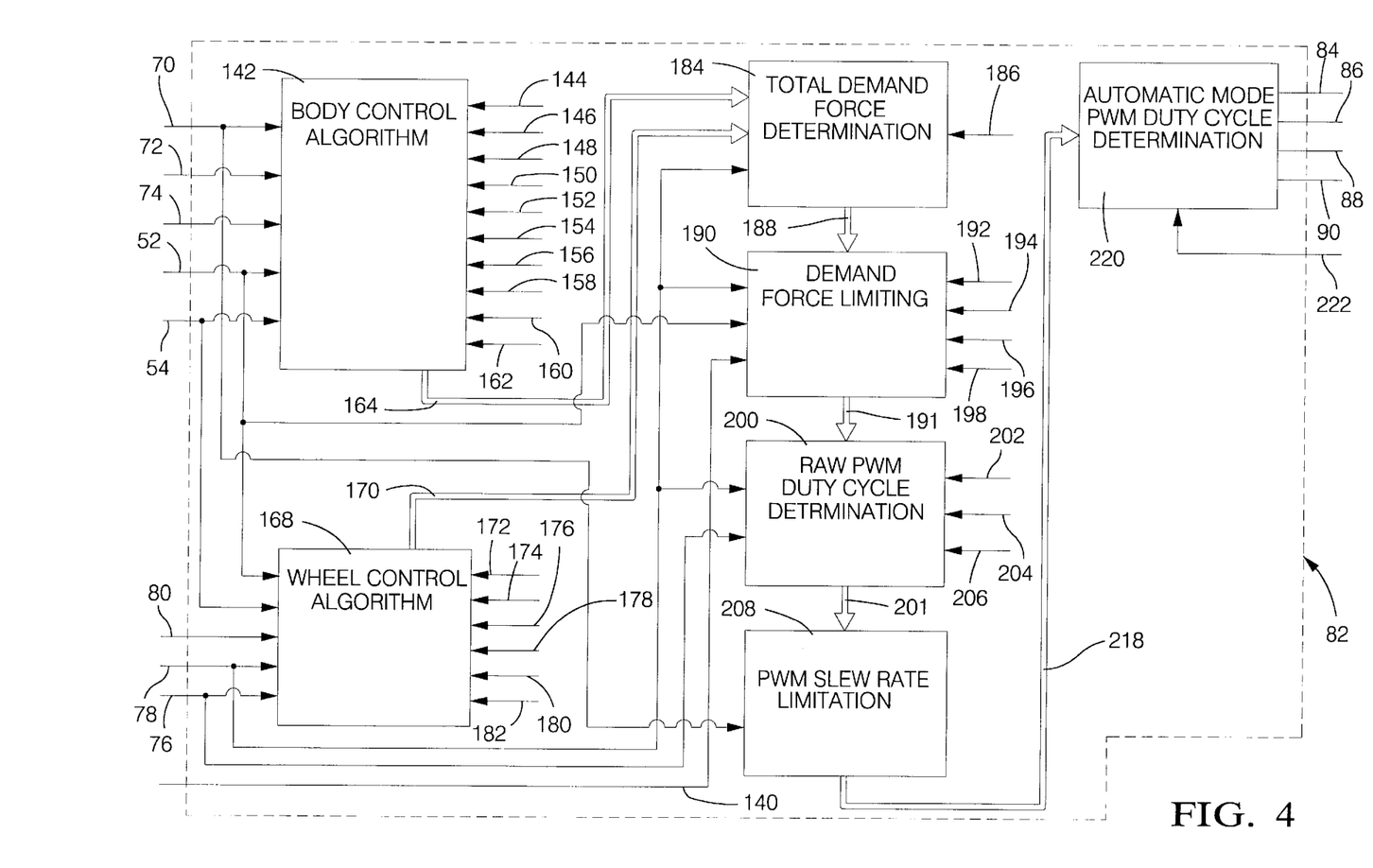
FIG. 4 is a block diagram of one embodiment for determining demand force commands according to the invention.

All of the outputs from signal conditioner 68 as well as additional outputs from FIG. 2 are provided as inputs to the automatic control algorithm 82, which is shown in greater detain in FIG. 4. The automatic control algorithm 82 includes body control algorithm 142, wheel control algorithm 168, total demand force determination 184, demand force limiting 190, raw PWM duty cycle determination 200, PWM slew rate limitation 208, and automatic mode PWM duty cycle determination 220.

The body control algorithm 142 receives the body modal velocities 70–74, the vehicle speed signal 52, and the computed lateral acceleration 54. The body control algorithm outputs a set of body demand forces on bus 164 (four lines).

The wheel control algorithm 168 responds to the buffered vehicle speed signal 52, the lateral acceleration 54, the four average wheel velocity signals 80, and the four lead-lag filtered relative velocity signals 78. The wheel control algorithm 168 provides the wheel demand force signals 170 to the total demand force determination Block 184. The wheel demand force signals include one signal for each corner of the vehicle.

The total demand force determination 184 receives the body demand forces on bus 164, the wheel demand forces on bus 170 and the lead-lag filtered relative velocity signals on lines 78. The total demand force determination 184 output is the total demand force for each corner of the vehicle responsive to each of the input values. While the total demand force for this embodiment is determined responsive to the lead-lag filtered relative velocity signal, if a lead-lag filter is not implemented, a non-lead-lag filtered relative velocity signal may be implemented instead.

More specifically, the total demand force determination 184 determines the total demand force $DF_{tot}$, for each actuator by combining the wheel and body demand forces and $DF_w$ and $DF_b$ respectively, based upon the phase of the demand forces. If the body and wheel demand forces are in-phase, the demand force is determined according to a wheel force as a minimum approach. That is, the demand force is set equal to the body demand force unless the body demand force is less than the wheel demand force, in which case the total demand force is set equal to the wheel demand force. If the wheel and body demand forces are out of phase, the forces are summed to generate the total demand force.

The wheel demand force of this embodiment will always have the same sign as the relative velocity and will always be passive. The body demand force may be active or passive. If the body and wheel demand forces are both passive, the demand forces are in-phase. If the body demand force is active, the demand forces are out-of-phase. Examples of a passive system are damper systems that do not provide energy from another source, such as a compressor storing high-pressure hydraulic fluid. These systems can only generate force that is the same sign (direction) as the relative velocity of the damper. Active dampers that have external supplies of energy can supply force independent of the relative velocity of the damper. On a force-versus-relative velocity plot, the passive quadrants are the first and third quadrants, that is, the quadrant in which relative velocity and force are both positive and the quadrant in which relative velocity and force are both negative. In the second and fourth quadrants, a passive damper cannot provide a commanded force.

The resulting four total demand force signals 188 of the total demand force determination 184 are passed to demand force limiting Block 190. Demand force limiting 190 performs a limiting function on the total demand force signals 188 responsive to the lead-lag filtered relative velocity signals 78, the vehicle speed signal 52 and the diagnostics signal 140. Demand force limiting 190 dynamically determines a maximum slope for the demand force curve. Additionally, it determines the maximum demand force responsive to that slope and limits the total demand force to that computed maximum. Once the demand forces are limited at Block 190, the resultant demand forces 191 are provided to the raw PWM duty cycle determination Block 200.

Raw PWM duty cycle determination provides damping control commands on bus 201 responsive to the signals on bus 191, the lead-lag filtered signals on lines 78 and the high pass relative velocity signals on line 76. Raw PWM duty cycle determination 200 compares the lead-lag filtered relative velocity signal and the total demand force signal for a particular corner, to determine if that corner suspension is in compression or rebound. If both the lead-lag filtered signal and demand force signal are positive, then the system is in rebound mode. If both the lead-lag filtered signal and the demand force signal are negative, then the system is in compression mode. A damper force table is applied to determine a raw PWM duty cycle command. The damper force table is implemented using table values 202 stored in memory, PWM duty cycles 204 stored in memory, and a damper force axis intercept scale factors 206, also stored in memory. The inputs to the table are the total demand force and the high pass filtered relative velocity for each corner. A total of up to eight tables are required in this embodiment because different tables are used for compression and rebound. Numerous other approaches are possible for alternative embodiments. The process will remain however to derive damping control commands from demand forces.

In total, four signals are provided by raw PWM duty cycle determination 200, representing the damping control commands for the four corners of the vehicle. These are output 201 to the PWM slew rate limitation Block 208. PWM slew rate limitation 208 is responsive to the damping control command signals 201, and the heave velocity signal 70. The PWM slew rate limitation 208 has separate up and down limits on the rate of change of the PWM signals used to control the variable force actuators. Separate limits are used to limit noise created by sudden changes in damper force, limit high frequency cycling of the damper valves, and attenuate high frequency components of the damper valve command. The slew factors in the downward direction may be a function of body demand forces. The PWM slew rate limitation Block 208 outputs the four slew filtered PWM signals 218.

The automatic mode PWM duty cycle determination 220 received signals 218 and may be implemented if desired to calibrate a minimum PWM command for each actuator. This minimum command on line 222 is used as a limit or base, which the duty cycle of the PWM command cannot be lower. The resultant output signals on lines 84, 86, 88 and 90 are the filtered PWM duty cycle commands.

Figure 5:
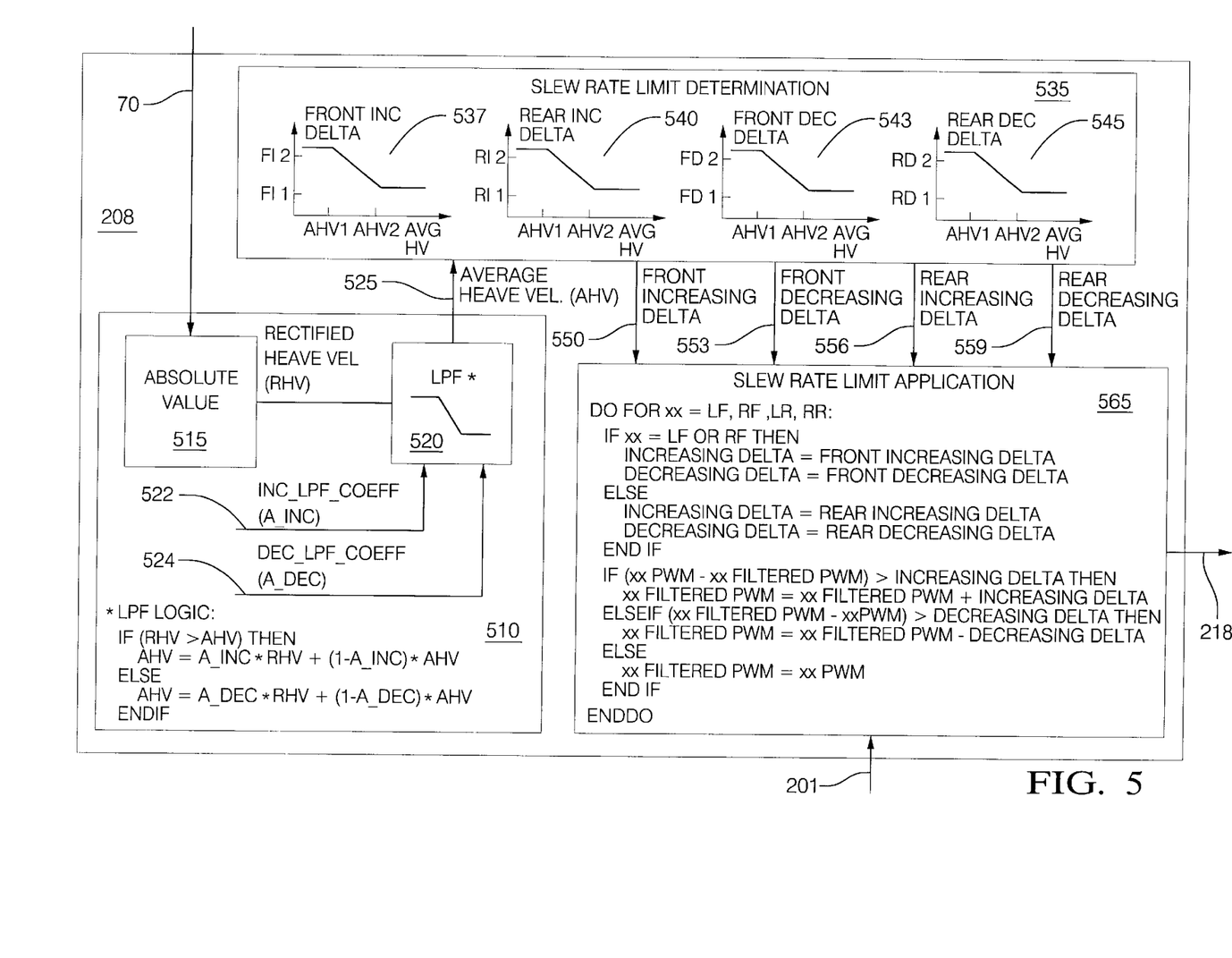
FIG. 5 is a block diagram of one embodiment for determining slew rate limitation values in accordance with the invention.

Details of the PWM slew rate limitation Block 208 are illustrated in FIG. 5. The damping control commands 201 for each corner are independently subjected to the PWM slew rate limitation algorithm in order to generate the slew filtered PWM signals 218 for each corner. For this embodiment, slew rate limitation is defined as a control placed on the amount by which each damping control command is allowed to change from one control loop to the next. The maximum change that is allowed will generally be different for upward versus downward changes in the damping control command input signals 201. The PWM slew rate limitation Block 208 is broken down into the slew rate limit determination 535, and the slew rate limit application 565. At all times, the control software is running the slew rate limitation algorithm. As a function of the control algorithm status, the parameters for the slew rate limitation algorithm will change. The parameters for the slew rate limit determination 535 are summarized in the table below:

| Inputs(s) | Heave Velocity |
|---|---|
| Outputs(s) | Front Increasing Delta |
| | Front Decreasing Delta |
| | Rear Increasing Delta |
| | Rear Decreasing Delta |
| Calibrations(s) | Front Increasing Delta 1 & 2 (FI1, FI2) |
| | Rear Increasing Delta 1 & 2 (RI1, RI2) |
| | Front Decreasing Delta 1 & 2 (FD1, FD2) |
| | Rear Decreasing Delta 1 & 2 (RD1, RD2) |
| | Average Heave Velocity 1 & 2 (AHV1, AHV2) |
| | Increasing low pass filter (LPF) Coefficient (INC_A) |
| | Decreasing low pass filter (LPF) Coefficient (DEC_A) |
| Execution Rate | 10 ms or faster |

The first step of PWM slew rate limitation block 208 is to compute a signal referred to as the average heave velocity 525. The average heave velocity is not a true mathematical average and is referenced herein as the output of the average heave velocity determination block 510. In one embodiment, the average heave velocity 525 is calculated according to the following equations and logic, or equivalent:

Rectified heave velocity (RHV)520=|heave velocity| 515

If rectified heave velocity (RHV)>average heave velocity (AHV) then 510

```
       AHV = INC_A * RHV + (1 - INC_A) * AHV
Else
       AHV = DEC_A * RHV + (1 - DEC_A) * AHV
Endif
```

Once the average heave velocity signal 525 has been computed as indicated above, the active set of slew rate limiting parameters 550–559 are determined from the above calibrations according to the following equations and logic, or equivalent 535–545:

If average heave velocity (AHV)<average heave velocity 1 (AHV1) then

```
Front increasing delta = front increasing delta 1 (FI1)
    Front decreasing delta = front decreasing delta 1 (FD1)
    Rear increasing delta = rear increasing delta 1 (RI1)
    Rear decreasing delta = rear decreasing delta 1 (RD1)
Elseif average heave velocity (AHV) ≥ average heave velocity 2 (AHV2)
then
    Front increasing delta = front increasing delta 2 (FI2)
    Front decreasing delta = front decreasing delta 2 (FD2)
    Rear increasing delta = rear increasing delta 2 (RI2)
    Rear decreasing delta = rear decreasing delta 2 (RD2)
```

```
Else
    Front increasing delta = FI1 + (AHV - AHV1)*(FI2 - FI1)/
(AHV2 - AHV1)
    Front decreasing delta = FD1 + (AHV - AHV1)*(FD2 - FD1)/
(AHV2 - AHV1)
    Rear increasing delta = RI1 + (AHV - AHV1)*(RI2 - RI1)/
(AHV2 - AHV1)
    Rear decreasing delta = RD1 + (AHV - AHV1)*(RD2 - RD1)/
(AHV2 - AHV1)
Endif
```

It is allowable and preferred from a loop-time standpoint, to perform the division operations in the above equations during calibration upload in order to store and use multiplicative equivalents during normal algorithm execution.

The parameters for the slew rate limit application 565 are summarized in the table below:

| Inputs(s) | Scaled Body PWM (4) |
|---|---|
| | Front Increasing Delta |
| | Front Decreasing Delta |
| | Rear Increasing Delta |
| | Rear Decreasing Delta |
| Outputs(s) | Filtered Body PWM (4) |
| | (carried forward as simply Body PWM (4)) |
| Calibrations(s) | None |
| Execution Rate | @Primary Loop Time |

The slew rate limit application 565 is executed as the following equations and logic, or equivalent:

```
Do for all corners (xx = lf through rr)
    If front damper (xx = lf or xx = rf) then
        Increasing delta = front increasing delta
        Decreasing delta = front increasing delta
    Else
        Increasing delta = rear increasing delta
        Decreasing delta = rear increasing delta
    Endif
    Delta (temp) = xx scaled body PWM - xx filtered body PWM
    If (delta <= 0) then
        If (|delta| > decreasing slew rate limit) then
            Delta = -decreasing slew rate limit
        Endif
    Else
        If(delta > increasing slew rate limit) then
            Delta = increasing slew rate limit
        Endif
    Endif
    xx filtered body PWM = xx filtered body PWM + delta
End do
```

As with all pseudo-code representations included in this application, the above is one of many possible embodiments. Any approach may be implemented provided the functionality is equivalent to that shown above. The resulting properties are those of the slew filtered PWM signals 218.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein

We claim:

1. A method of controlling dampers in a suspension system for a vehicle body, comprising:
   deriving a heave velocity of a vehicle body from sensed dynamic variables of the vehicle body;

low pass filtering a magnitude of the heave velocity value with a first low pass filter coefficient while the magnitude is increasing and with a second low pass filter coefficient while the magnitude is not increasing;

deriving a slew rate limit from the low pass filtered magnitude of the heave velocity;

generating a damping control command for at least one of the dampers in accordance with the slew rate limit; and applying the damping control command to the one of the dampers.

2. A control module for a suspension damping control system for a vehicle body comprising:

means for deriving a heave velocity of a vehicle body from sensed dynamic variables of the vehicle body;

means for low pass filtering a magnitude of the heave velocity value with a first low pass filter coefficient while the magnitude is increasing and with a second low pass filter coefficient while the magnitude is not increasing;

means for deriving a slew rate limit for a damping control command from the low pass filtered magnitude of the heave velocity of the vehicle body;

means for generating the damping control command for at least one of the dampers in accordance with the slew rate limit; and means for applying the damping control command to the one of the dampers.

3. A method of controlling a damper in a suspension system for a vehicle body, comprising:

determining an average heave velocity function for the vehicle body;

determining a slew rate limit as a function of the average heave velocity; and limiting a damping control command to the damper in accordance with the slew rate limit, wherein the average heave velocity function is calculated in the following manner:

---

Rectified heave velocity (RHV) = |heave velocity|;
If Rectified heave velocity (RHV) > Average heave velocity (AHV),
Then, AHV = INC_A * RHV + (1-INC_A) * AHV,
Else, AHV = DEC_A * RHV + (1-DEC_A) * AHV,
Endif;

--- wherein INC_A is an increasing LPF coefficient and DEC_A is a decreasing LPF coefficient.

4. A computer readable medium storing a computer program for a suspension damping control system comprising:

computer readable code for determining an average heave velocity for the vehicle body from input dynamic variables of a vehicle body;

computer code for low pass filtering a magnitude of the heave velocity with a first low pass filter coefficient while increasing and with a second low pass filter coefficient while not increasing;

computer readable code for determining a slew rate limit from the low pass filtered magnitude of the filtered average heave velocity; and computer readable code for generating a vehicle body damping control command limited in accordance with the slew rate limit for at least one damper in the suspension damping control system.

5. A method of controlling a damper in a suspension system for a vehicle body, comprising:

deriving a relative heave velocity value from sensed relative body/wheel position sensors associated with the suspension system;

determining a heave velocity estimate for the vehicle body by low pass filtering the relative heave velocity value to suppress content therein due to vertical wheel motion;

determining an average heave velocity function by low pass filtering a magnitude of the heave velocity estimate;

determining a slew rate limit as a function of the average heave velocity function; and limiting a damping control command to the damper in accordance with the slew rate limit.

6. The method of claim 5 wherein the slew rate limit decreases as a function of the average heave velocity function through a predetermined range of the average heave velocity function.

7. The method of claim 5 wherein the average heave velocity function is determined by low pass filtering the magnitude of the heave velocity estimate with a first low pass filter coefficient while the magnitude is increasing and with a second low pass filter coefficient while the magnitude is not increasing.

8. The method of claim 7 wherein the slew rate limit decreases as a function of the average heave velocity function through a predetermined range of the average heave velocity function.

* * * * *